April 17, 1945.   P. D. OBOLENSKY   2,373,704
REEL OR SPOOL FOR MOTION PICTURE FILMS
Filed Aug. 4, 1941   2 Sheets-Sheet 1
Fig.1
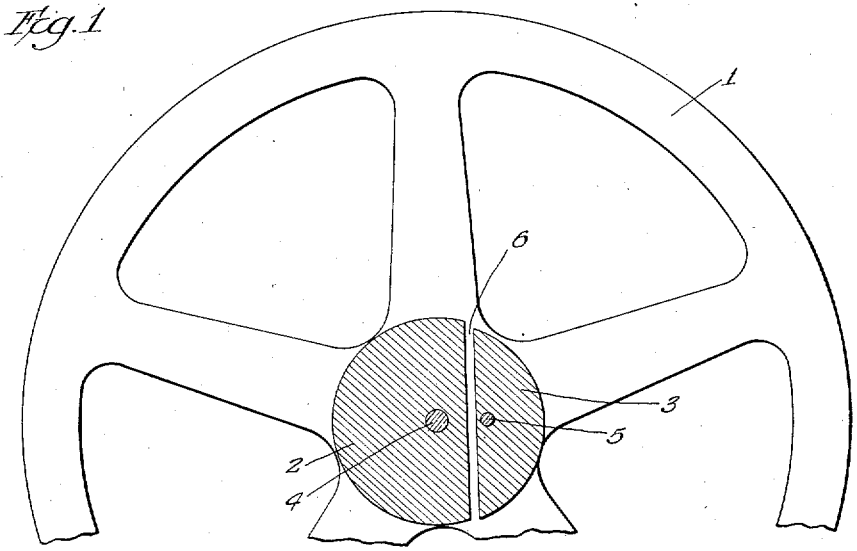
Fig.2 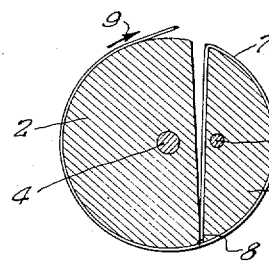   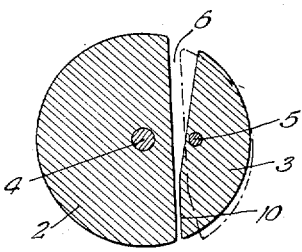 Fig.3
Fig.4 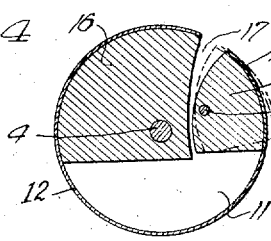   Fig.5 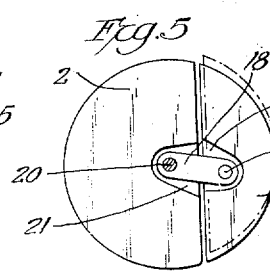   Fig.6 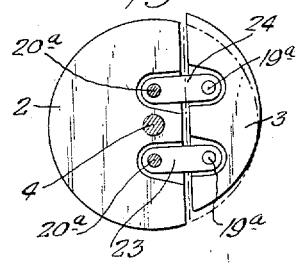
Fig.7 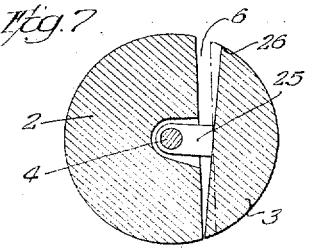   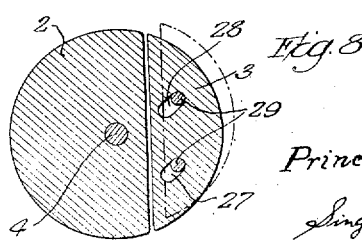 Fig.8
Inventor:
Prince Dmitri Obolensky
BY
Singer, Ehlert, Stern & Carlberg
Attys.

April 17, 1945. P. D. OBOLENSKY 2,373,704
REEL OR SPOOL FOR MOTION PICTURE FILMS
Filed Aug. 4, 1941 2 Sheets-Sheet 2
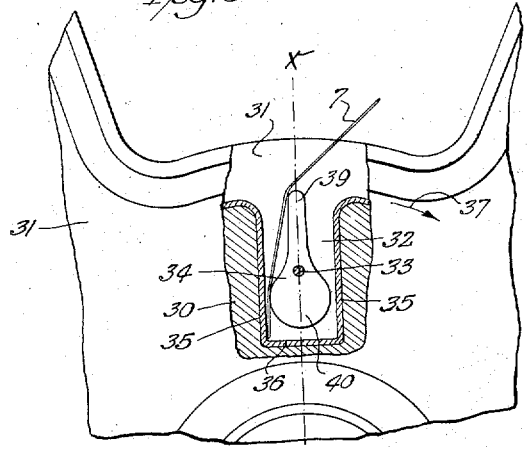
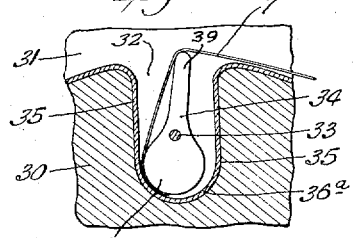
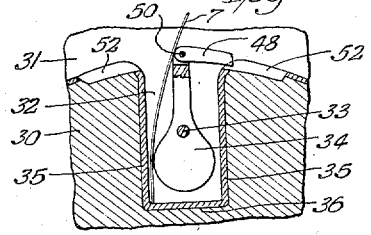
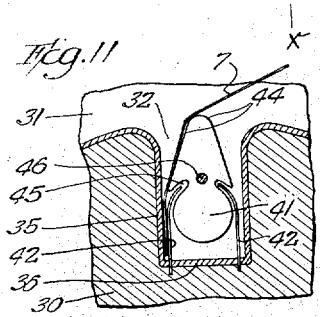
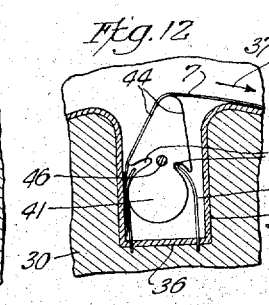
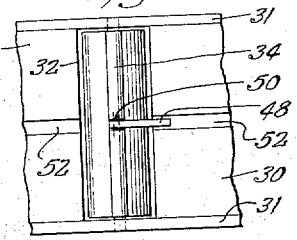
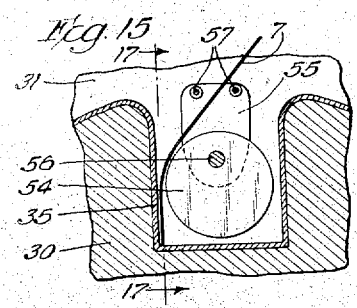
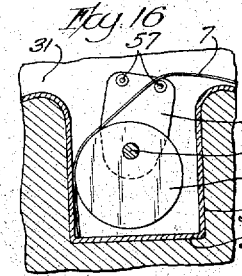
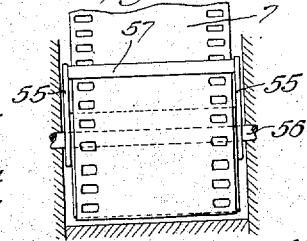
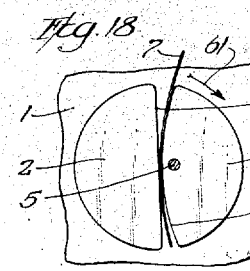
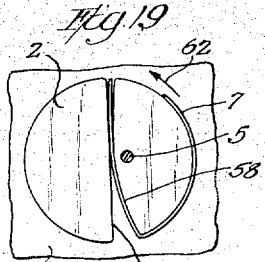
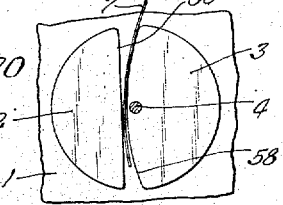
Inventor:
Prince Dmitri Obolensky
BY
Singer, Ehlert, Stern & Carlberg
Attys Patented Apr. 17, 1945

2,373,704

UNITED STATES PATENT OFFICE 2,373,704

REEL OR SPOOL FOR MOTION-PICTURE FILMS

Prince Dmitri Obolensky, Dresden, Germany; vested in the Alien Property Custodian Application August 4, 1941, Serial No. 405,443
In Germany October 15, 1939

7 Claims. (Cl. 242—74)

The invention relates to improvements in reels or spools for motion picture films and particularly is directed to novel means for attaching the film to the core of the reel or spool.

The principal object of the invention is to secure the end of a motion picture film, regardless of whether the film is ready for projection or is still light sensitive, in such manner to the core of the reel or spool that already during the formation of the first winding the film is securely fastened. At the same time the film is adapted to be released automatically from the reel or spool during its unwinding movement, without any sudden jerk when the end of the film separates from the core, so that a tearing of the film or any other injury to the same is avoided.

The prior attempts and proposals to solve the above problems have not been very successful, because the film was either not attached with sufficient security to the core and caused the film to slip, or the film was attached too firmly, with the result that upon an unwinding of the film the latter is subjected to great mechanical stresses when the end of the film separates from the core of the reel or spool.

It is an object of the present invention to overcome these disadvantages by dividing the core of the reel or spool in axial direction in two parts and mounting one of the parts movable with respect to the other part which is fixedly attached to the flanges of the reel or spool, so that the end of a film which is inserted between the two parts is adapted to be clamped in position when the movable part of the core is actuated by the film during the winding of the same on the core.

Another object of the invention is to mount the movable part of the divided core of the reel or spool rotatable about an axis or axes parallel to the axis of rotation of the reel or spool, so that the movable part of the core can readily be rotated by the film to be attached to the core.

Other objects of the invention will be apparent or will be specifically pointed out in the description forming a part of this specification, but the invention is not limited to the embodiments of the invention herein described, as numerous other forms may be adopted within the scope of the claims.

Referring to the drawings which illustrate by way of example several embodiments of the invention:

Fig. 1 is a cross sectional view of a film reel, with the section being taken through the core of the reel;

Fig. 2 illustrates the position of the movable part of the core when a film is wound on the reel;

Figs. 3 to 8 show each a different embodiment of the core of the reel;

Figs. 9 and 10 illustrate a portion of a reel or spool provided with a modified embodiment of a film clamping device in inoperative and operative position respectively;

Figs. 11 and 12 illustrate a modification of the clamping device of Figs. 9 and 10, in inoperative and operative position respectively;

Figs. 13 and 14 show in sectional view and plan view respectively another modification of the clamping device, similar to Figs. 9 and 10;

Figs. 15 and 16 illustrate another embodiment of the clamping device of the invention;

Fig. 17 is a sectional view along the line 17—17 of Fig. 15;

Figs. 18 to 20 illustrate another type of the clamping device according to the invention.

Fig. 1 illustrates a film reel provided with a cylindrical core divided along a plane parallel to the reel axis 4. The flanges 1 of the reel are fixedly attached to the larger part 2 of the core, while the smaller part 3 of the core is pivotally mounted about an axis 5, the ends of which are supported by the flanges 1. The space or slot 6 between the adjacent plane faces of the core parts 2 and 3 preferably is not much wider than the thickness of the standard motion picture film.

Fig. 2 illustrates diagrammatically the attachment of the film to the core of the reel. The end of the film 7 is inserted into the slot 6 until it reaches the other end of the same as shown at 8. Then the film 7 is wound first about the movable core part 3 and then about the fixed core part 2 and thereby rotates the former about the axis 5 and clamps the end of the film firmly between the two core parts. The arrow 9 in this figure indicates the winding direction of the film.

Preferably, the dimensions of the movable part 3 of the core are made such that the first portion of the first winding of the film forms a flushed continuation of the circumference of the fixed part 2 of the core, i. e. no step is formed where the film leaves the slot 6 and passes along the circumference of part 3. This result is obtained by making the radius of curvature of the curved face of part 3 somewhat smaller than the radius of curvature of the curved face of part 2, namely about the thickness of the standard motion picture film.

Fig. 3 illustrates a modified construction of the core of the film reel. The plane face of the movable part 3 of the core is provided with a slant 10 of such inclination that the end of the film is not clamped merely along a line between the parts 2 and 3 when the latter is rocked about its pivot axis 5, as in Figs. 1 and 2, but is clamped securely between two plane areas.

In the Figs. 3, 4, 5, 7 and 8 the movable part of the core, as shown in solid lines, indicates the position in which a film is held securely attached to the core, while the dotted lines indicate the position of the movable part of the core prior to the insertion of the film into the slot of the core.

Fig. 4 illustrates the present invention as applied to the core of a relatively large film reel. In reels of this type the core is made larger and preferably hollow to save on material. In order to employ the present invention the hollow core 11 is cut open, so that a fixed part 12 and a movable part 13 is produced. The movable part 13 is attached to a block 14, made for instance of wood, which is pivotally mounted about an axis 15, the ends of which are supported by the flanges of the reel. In similar manner a block or filling 16 is arranged in the fixed part 12 of the core, so that a narrow slot 17 is formed between the parts 14 and 16 in which the end of a film may be inserted to be clamped in position as described in the foregoing.

Fig. 5 illustrates an embodiment of the invention in which the end portion of the film inserted in the slot of the core is engaged uniformly by the entire plane face of the movable core part 3 and clamped against the fixed core part 2. This is accomplished by links 18 which are pivotally attached at 19 to the movable core part 3 and at 20 to the fixed core part 2. Both parts 2 and 3 of the core are recessed at 21 and 22 respectively, to provide free movement of the links 18 so that the movable core part 3 is able to clamp the end of the film against part 2 when the film 7 is passed around the curved circumference of part 3.

Fig. 6 illustrates a modification of Fig. 5, in that the movable part 3 of the core of the reel is attached to the fixed part 2 of the core by pairs of links 23 and 24 which are mounted in the same manner as the single links 18 by means of pivot pins 19ª and 20ª respectively. In this figure the part 3 as illustrated in solid lines shows the inoperative position of part 3, while the dotted lines indicate the position of the part 3 when the film is clamped in the core.

Fig. 7 illustrates a modification of Fig. 2, in that the movable part 3 of the core is provided with arm-like extensions 25 pivotally attached to the axis 4 of the reel. In this embodiment also, the movable part 3 is provided with a rounded edge at 26 so as to prevent too sharp a bend in the film at this point when the film, after having been inserted in the slot 6, is wound around the core. Obviously, the movable core parts 3 of the other embodiments may be similarly provided with a rounded edge.

Fig. 8 illustrates an embodiment, which as far as the result is concerned is similar to the Figs. 5 and 6. In this case, however, the movable part 3 of the core is provided with a pair of parallel inclined slots 27, 28 through which pass the two rods 29, the ends of which are fixed to the flanges of the reel. It will be clear that when the film is inserted in the slot between the core parts 2 and 3 and then is wound around the part 3, that the latter moves automatically from the dotted line position into the position illustrated in solid lines in which the film is clamped firmly in the core.

In order to facilitate in the embodiments of Figs. 1 to 7 the release of the film from the core of the reel when the film is unwound, the invention contemplates the employment of small helical springs, which are to be arranged on the axes 4, 5, 15, 19, 20, 19ª and 20ª in such manner, that after the unwinding of the last winding of the film the movable part 3 of the core is urged positively away from the fixed part 2 of the core, thus releasing the end of the film in the slot 6 immediately. In Fig. 8 the employment of small leaf springs is considered advisable for the last mentioned purpose. These springs may be mounted in the slots 27, 28 in such manner that after the unwinding of the last winding of the film the part 3 is pushed away from the fixed part 2.

It is also within the scope of the invention to arrange the aforesaid helical springs and leaf springs respectively, in such manner that normally the movable part of the core of the reel is urged into operative clamping position toward the fixed part of the core.

Furthermore, the surface of the two parts of the core, which come into clamping contact with the end of the film, may be roughened or even may be provided with undulations or ridges in order to increase the friction which in the clamping position of the core holds the end of the film.

The above described constructions of the core permit a secure clamping of the end of the film only in one direction of winding, and when it is desirable or necessary to effect a secure clamping of the film selectively in both directions of winding a somewhat different construction of the film clamping means has to be employed, as will be described hereinafter.

In accordance with another object of the present invention the fixed and movable part of the core of the reel or spool may be arranged and constructed relatively to each other in such manner that the insertion, attachment and release of the film for winding and unwinding respectively, is possible in both directions of rotation of the reel or spool. The Figs. 9 to 20 illustrate various embodiments of a film reel of this type.

Fig. 9 illustrates a portion of a film reel as it is used for motion picture projectors. The part 30 of the core is fixedly attached to the flanges 31 of the reel and is provided with a radical recess 32 in which is pivotally mounted about an axis 33 the movable part 34 of the core. As illustrated in this Fig. 9, the movable part 34 is positioned in a neutral or inoperative position and so to speak is divided by the radial plane X—X in two equal sections. Fig. 9 illustrates also how the end of the film 7 is introduced into the clamping device formed by the side walls 35 of the radial recess 32 and the movable part 34. It will be noted that the film 7 is inserted into the recess 32 until it reaches the bottom 36 of the same, which is sufficient to insure a firm clamping of the film as soon as the film is wound in the direction of the arrow 37 about the core. When this is done the upper narrow end 39 of the part 34 tilts toward the right and its lower enlarged end 40 is moved toward the left and clamps the end of the film against the left hand side wall 35 of the recess 32. Preferably, the movable part 34 is so arranged in the recess 32 that in its neutral position the narrow end 39 projects somewhat beyond the outer circumference of the core, and in its tilted operative position lies about flush with the same. In case it is desired to wind the film in the opposite direction on the reel the end of the film is inserted in the right hand side of the recess 32 to be clamped by the part 34 against the right hand side wall 35 of the recess 32, as will be obvious from the Fig. 9. In such cases where the movable part 34 is almost completely inserted in the radial recess 32 it is advisable to make this part 34 of such shape and form that its center of gravity will be positioned between the center of the reel and the pivot axis 33.

Fig. 10 illustrates an embodiment of the invention which differs from Fig. 9 only in the shape of the recess which accommodates the movable core part 30. In Fig. 10 the radial recess 32 is provided with a curved bottom 36ᵃ which has the advantage that the end of the film makes a better frictional contact with the clamping faces, in that the contact takes place over a larger area and not only along a line.

The Figs. 11 and 12 illustrate a modified embodiment of the clamping means in which the end of the film is not directly clamped by the movable part 41 against the walls of the recess 32, but by means of leaf springs 42. These springs 42 engage the film 7 over a larger area and insure a better clamping engagement, and have the additional advantage that the film is not damaged by any rubbing engagement with the clamping faces. The upper or outer end of the part 41 is provided with inclined faces 44 which guide the end of the film into the narrow space between the side walls 35 of the radial recess 32 and the springs 42. The free upper end of the leaf springs 42 project into narrow slits 45 of the part 41 near the pivot axis 46 thereof. Fig. 11 shows the position of the movable part 41 during the insertion of the film, and Fig. 12 shows the part 41 in operative clamping position.

The Figs. 13 and 14 illustrate a modification of the device shown in Fig. 9, in that an additional element 48 is provided which indicates the required direction of rotation of the reel when the end of a film has been inserted in the clamping device. The element 48 has the form of a short lever whose one end is pivotally attached at 50 to the upper end of the movable part 34 and whose other end is adapted to be received loosely and selectively in any one of two grooves 52 provided in the fixed core part 30 adjacent the upper ends of the recess 32. It is believed to be obvious, that when the lever 48 lies in the right hand groove 52 (Figs. 13, 14) the film 7 can only be inserted in the left hand side of the recess 32 and has to be wound clockwise about the core in order to effect a clamping of the end of the film inserted in the clamping device. On the other hand, the film 7 has to be inserted in the right hand side of the recess 32 when the lever 48 has been reversed so as to lie in the left hand groove 52.

The Figs. 15, 16 and 17 illustrate a clamping device in which the pivotally mounted part is returned positively to its neutral or inoperative position by the film upon unwinding the same. The pivotally mounted part of the clamping device is composed of a cylindrical member 54 having attached at each end a plate 55 and rotatable about an axis 56 which is eccentrically located with respect to the center axis of the cylindrical member 54. The upper or outer ends of the two plates 55 are connected with each other by two spaced parallel rods 57 between which the film 7 to be attached to the reel is inserted. The Figs. 15 and 16 illustrate clearly how the film 7 is gripped by the clamping device and in what manner the film will actuate the pivotally mounted clamp member to release the clamping device when the film is unwound from the reel.

The Figs. 18 and 19 disclose an embodiment of the invention which is particularly suitable for rollfilm spool and any other type of spools having a relatively small core. The movable part 3 of the core is made somewhat larger with respect to the fixed part 2 than in the previously described embodiments, but still renders it possible to insert, clamp and release the film 7 in either direction of rotation. It will be noted that the movable core part 3 is provided with a convex clamping face 58 which urges the film against the cooperating plane clamping face 60 of the other core part 2 fixedly secured to the spool flanges 1. In both Figs. 18 and 19, the dotted lines indicate the operative clamping position of the movable core part 3 when holding a film wound on the spool in opposite direction respectively, as indicated by the arrows 61 (Fig. 18) and 62 (Fig. 19).

Fig. 20 illustrates a modified embodiment of the clamping means shown in the Figs. 18 and 19. In this Fig. 20 the pivotally mounted part 3 of the core of the spool is larger than the part 2 which is fixedly attached to the flanges 1 of the spool, and the pivot axis of the part 3 may coincide with the axis of rotation 4 of the spool as shown.

In the above described embodiments of the invention the film is attached or clamped to the core of the reel or spool by means of a lever of the first class i. e. a lever pivoted between its ends, one end of which is actuated by the film, while the other end clamps the film against the cooperating part of the core. It is, however, also possible to employ as a movable part of the core a lever of the second class comprising a single arm which is pivotally mounted at one end near the bottom of the recess in the core, whereby the film is clamped against either wall of the recess by a portion of the latter between the pivoted end and the outer end over which the film passes while being wound on the core.

What I claim is:

1. Reel or spool for motion picture film, including a core and two flanges, said core being subdivided in axial direction in two parts of which one has fixedly attached thereto said two flanges, and means for pivotally supporting the other part of the core for movement about an axis spaced from the periphery of the core and parallel to the axis of rotation of said reel or spool, whereby said movable core part is moved about its axis to bear against the fixed core part to automatically clamp the film inserted loosely between said two parts of the core by pressing it against the fixed core part when the film is wound first over the outer face of the pivoted core part.

2. Reel or spool for motion picture film, including a core and two flanges, said core being subdivided in axial direction in two parts of which one has fixedly attached thereto said two flanges, and means for rotatably supporting the other part of the core about an axis spaced from the periphery of the core within the cross-sectional area of the core and parallel to the axis of rotation of said reel or spool, whereby said movable core part is moved about its axis to bear against the fixed core part to automatically clamp the film inserted loosely between said two parts of the core against the fixed core part when the film is wound in a direction upon the core in which the first winding passes first over the outer face of the rotatable core part and then over the outer face of the fixed core part.

3. Reel or spool for motion picture film, including a core and two flanges, said core being subdivided in axial direction in two parts having adjacent plane faces provided with aligned recesses respectively, one of said parts having fixedly attached thereto said two flanges, and means for movably supporting the other part of said core, said means including at least two spaced parallel rods at right angles to said surfaces and having their ends pivoted in said recesses, said two parts of the core being adapted to clampingly engage a film which is loosely inserted between the same upon rotation of the reel in a direction in which the film passes first over the outer face of the movable part of the core.

4. Roll or spool for motion picture film, including a core and two flanges, said core being subdivided in axial direction in two parts of which one has fixedly attached thereto said two flanges, and means for movably supporting the other part of said core, said means including two pairs of spaced parallel links pivotally mounted on said movable core part and said fixed core part and at right angles to the axis of the reel, said two parts of the core being adapted to automatically clampingly engage a film which has been loosely inserted between the same upon rotation of the reel in a direction in which the film passes first over the outer face of the movable part of the core.

5. Reel or spool for motion picture film, including a core and two flanges, said core being subdivided in axial direction in two parts of which one has fixedly attached thereto said two flanges, and means for movably supporting the other part of the core, said means including two pairs of spaced parallel links pivotally mounted on said movable core part and said fixed core part, at right angles to the axis of the reel and completely contained within said core, said two parts of the core being adapted to clampingly engage a film which is loosely inserted between the same.

6. Reel or spool for motion picture film, including a core and two flanges, said core being subdivided in axial direction in two parts of which one has fixedly attached thereto said two flanges, and means for movably supporting the other part of said core, said movable part of the core being rotatable relatively to said fixed part of the core about an axis spaced from the periphery of the core and extending lengthwise of the core and within the same, so as to be moved about its axis to bear against the fixed part of the core to automatically clamp the end of a film inserted loosely between said two parts of the core against the fixed core part when the film is wound upon the core in a direction in which the film passes first over the outer face of the movable core part and then over the fixed core part.

7. Reel or spool for motion picture film, including a core and two flanges, said core being subdivided in axial direction in two parts of which one has fixedly attached thereto said two flanges, and means for movably supporting the other part of said core, said movable part of the core being rotatable relatively to said fixed part of the core about the axis of rotation of the reel or spool, so as to automatically clamp the end of a film inserted loosely between said two parts of the core against the fixed core part when the film is wound upon the core in a direction in which the film passes first over the outer face of core part.

PRINCE DMITRI OBOLENSKY.

---

CERTIFICATE OF CORRECTION.

Patent No. 2,373,704. April 17, 1945.

PRINCE DMITRI OBOLENSKY.

It is hereby certified that error appears in the printed specification of the above numbered patent requiring correction as follows: Page 4, second column, line 36, claim 7, after the words "face of" insert --the movable core part and then over the fixed--; and that the said Letters Patent should be read with this correction therein that the same may conform to the record of the case in the Patent Office.

Signed and sealed this 19th day of June, A. D. 1945.

(Seal)

Leslie Frazer
Acting Commissioner of Patents.

face of the rotatable core part and then over the outer face of the fixed core part.

3. Reel or spool for motion picture film, including a core and two flanges, said core being subdivided in axial direction in two parts having adjacent plane faces provided with aligned recesses respectively, one of said parts having fixedly attached thereto said two flanges, and means for movably supporting the other part of said core, said means including at least two spaced parellel rods at right angles to said surfaces and having their ends pivoted in said recesses, said two parts of the core being adapted to clampingly engage a film which is loosely inserted between the same upon rotation of the reel in a direction in which the film passes first over the outer face of the movable part of the core.

4. Roll or spool for motion picture film, including a core and two flanges, said core being subdivided in axial direction in two parts of which one has fixedly attached thereto said two flanges, and means for movably supporting the other part of said core, said means including two pairs of spaced parallel links pivotally mounted on said movable core part and said fixed core part and at right angles to the axis of the reel, said two parts of the core being adapted to automatically clampingly engage a film which has been loosely inserted between the same upon rotation of the reel in a direction in which the film passes first over the outer face of the movable part of the core.

5. Reel or spool for motion picture film, including a core and two flanges, said core being subdivided in axial direction in two parts of which one has fixedly attached thereto said two flanges, and means for movably supporting the other part of the core, said means including two pairs of spaced parallel links pivotally mounted on said movable core part and said fixed core part, at right angles to the axis of the reel and completely contained within said core, said two parts of the core being adapted to clampingly engage a film which is loosely inserted between the same.

6. Reel or spool for motion picture film, including a core and two flanges, said core being subdivided in axial direction in two parts of which one has fixedly attached thereto said two flanges, and means for movably supporting the other part of said core, said movable part of the core being rotatable relatively to said fixed part of the core about an axis spaced from the periphery of the core and extending lengthwise of the core and within the same, so as to be moved about its axis to bear against the fixed part of the core to automatically clamp the end of a film inserted loosely between said two parts of the core against the fixed core part when the film is wound upon the core in a direction in which the film passes first over the outer face of the movable core part and then over the fixed core part.

7. Reel or spool for motion picture film, including a core and two flanges, said core being subdivided in axial direction in two parts of which one has fixedly attached thereto said two flanges, and means for movably supporting the other part of said core, said movable part of the core being rotatable relatively to said fixed part of the core about the axis of rotation of the reel or spool, so as to automatically clamp the end of a film inserted loosely between said two parts of the core against the fixed core part when the film is wound upon the core in a direction in which the film passes first over the outer face of core part.

PRINCE DMITRI OBOLENSKY.

---

CERTIFICATE OF CORRECTION.

Patent No. 2,373,704. April 17, 1945.

PRINCE DMITRI OBOLENSKY.

It is hereby certified that error appears in the printed specification of the above numbered patent requiring correction as follows: Page 4, second column, line 36, claim 7, after the words "face of" insert --the movable core part and then over the fixed--; and that the said Letters Patent should be read with this correction therein that the same may conform to the record of the case in the Patent Office.

Signed and sealed this 19th day of June, A. D. 1945.

(Seal)

Leslie Frazer
Acting Commissioner of Patents.